United States Patent
Scenini et al.

(10) Patent No.: US 10,321,533 B2
(45) Date of Patent: Jun. 11, 2019

(54) DRIVING SEVERAL LIGHT SOURCES

(71) Applicant: Infineon Technologies AG, Neubiberg (DE)

(72) Inventors: Andrea Scenini, Montegrotto Terme (IT); Giovanni Capodivacca, Padua (IT); Adolfo De Cicco, Castel d'Azzano (IT)

(73) Assignee: Infineon Technologies AG, Neubiberg (DE)

(*) Notice: Subject to any disclaimer, the term of this patent is extended or adjusted under 35 U.S.C. 154(b) by 0 days.

(21) Appl. No.: 15/691,526

(22) Filed: Aug. 30, 2017

(65) Prior Publication Data

US 2017/0367160 A1 Dec. 21, 2017

Related U.S. Application Data

(63) Continuation of application No. 14/719,035, filed on May 21, 2015, now Pat. No. 9,781,800.

(51) Int. Cl.
*H05B 33/08* (2006.01)

(52) U.S. Cl.
CPC ..... *H05B 33/0857* (2013.01); *H05B 33/0842* (2013.01)

(58) Field of Classification Search
CPC ........ H05B 33/02; H05B 33/04; H05B 33/08; H05B 33/0803; H05B 33/0806; H05B 33/0824; H05B 33/0842; H05B 37/02; G09G 3/006; G09G 2320/00; G09G 2320/02; G09G 2320/04

See application file for complete search history.

(56) References Cited

U.S. PATENT DOCUMENTS

| | | |
|---|---|---|
| 5,184,114 A | 2/1993 | Brown |
| 5,798,535 A | 8/1998 | Huang et al. |
| 5,850,205 A | 12/1998 | Blouin |
| 5,866,922 A | 2/1999 | Huang et al. |
| 6,147,617 A * | 11/2000 | Kim ............ G09G 3/006 324/556 |
| 6,285,084 B1 | 9/2001 | Hikita et al. |
| 6,380,687 B1 | 4/2002 | Yamazaki |

(Continued)

FOREIGN PATENT DOCUMENTS

| | | |
|---|---|---|
| CN | 101123066 A | 2/2008 |
| CN | 100454361 C | 1/2009 |

(Continued)

OTHER PUBLICATIONS

U.S. Appl. No. 15/355,779, filed Nov. 18, 2016, by Andrea Scenini.

(Continued)

*Primary Examiner* — Jason Crawford
(74) *Attorney, Agent, or Firm* — Shumaker & Sieffert, P.A.

(57) ABSTRACT

A device for driving several light sources is provided, wherein the several light sources are arranged in a matrix structure; wherein the several light sources of the matrix structure are connected to a semiconductor device; wherein a portion of the semiconductor device corresponds to a light source of the matrix structure, wherein the portion of the semiconductor device comprises a diagnosis function which when activated is arranged for supplying an output diagnosis signal.

19 Claims, 9 Drawing Sheets

(56) References Cited

U.S. PATENT DOCUMENTS

| | | | |
|---|---|---|---|
| 6,806,497 B2 | 10/2004 | Jo | |
| 7,265,572 B2 | 9/2007 | Osada | |
| 7,271,791 B2 | 9/2007 | Yamazaki | |
| 7,274,351 B2 | 9/2007 | Washio et al. | |
| 7,372,440 B2 | 5/2008 | Ota et al. | |
| 7,518,393 B2 | 4/2009 | Shirasaki et al. | |
| 7,525,530 B2 | 4/2009 | Takafuji et al. | |
| 7,602,215 B2 | 10/2009 | Osame et al. | |
| 8,169,163 B2 | 5/2012 | Kang et al. | |
| 8,188,942 B2 | 5/2012 | Yoo et al. | |
| 8,199,074 B2 | 6/2012 | Wang et al. | |
| 8,242,496 B2 | 8/2012 | Yamazaki et al. | |
| 8,314,756 B2 | 11/2012 | Rankov et al. | |
| 8,410,788 B2* | 4/2013 | Hartrampf | G09G 3/006 324/537 |
| 8,692,758 B2 | 4/2014 | Matsuda et al. | |
| 9,124,260 B2 | 9/2015 | Furuta et al. | |
| 9,232,584 B2* | 1/2016 | Kanemitsu | H05B 33/0815 |
| 9,299,302 B2 | 3/2016 | Washio | |
| 9,355,596 B2 | 5/2016 | Shin et al. | |
| 9,356,088 B2 | 5/2016 | Chen | |
| 9,361,823 B2 | 6/2016 | Takahama et al. | |
| 9,450,036 B2 | 9/2016 | Kimura et al. | |
| 9,530,336 B2* | 12/2016 | Safavi | G09G 3/006 |
| 9,781,800 B2* | 10/2017 | Scenini | H05B 33/0857 |
| 9,974,130 B2* | 5/2018 | De Cicco | H05B 33/0824 |
| 2003/0132447 A1 | 7/2003 | Yukimoto | |
| 2003/0193459 A1* | 10/2003 | Kim | G09G 3/006 345/87 |
| 2004/0008072 A1 | 1/2004 | Kimura et al. | |
| 2004/0208011 A1 | 10/2004 | Horiuchi et al. | |
| 2005/0088380 A1 | 4/2005 | Bulovic et al. | |
| 2005/0200291 A1 | 9/2005 | Naugler, Jr. et al. | |
| 2005/0206606 A1 | 9/2005 | Takafuji et al. | |
| 2005/0245046 A1 | 11/2005 | Takafuji et al. | |
| 2005/0285822 A1 | 12/2005 | Reddy et al. | |
| 2006/0007076 A1 | 1/2006 | Sheats et al. | |
| 2006/0007204 A1 | 1/2006 | Reddy et al. | |
| 2006/0007205 A1 | 1/2006 | Reddy et al. | |
| 2006/0007206 A1 | 1/2006 | Reddy et al. | |
| 2006/0007248 A1 | 1/2006 | Reddy et al. | |
| 2006/0007249 A1 | 1/2006 | Reddy et al. | |
| 2006/0064612 A1 | 3/2006 | Knapp et al. | |
| 2006/0202923 A1 | 9/2006 | Osada | |
| 2007/0008297 A1 | 1/2007 | Bassetti | |
| 2007/0171271 A1 | 7/2007 | Wey et al. | |
| 2008/0111888 A1 | 5/2008 | Tewinkle et al. | |
| 2008/0284714 A1 | 11/2008 | Wu et al. | |
| 2009/0033643 A1 | 2/2009 | Schmidt et al. | |
| 2009/0191671 A1 | 7/2009 | Takafuji et al. | |
| 2009/0251391 A1 | 10/2009 | Ng et al. | |
| 2009/0269907 A1 | 10/2009 | Takafuji et al. | |
| 2010/0144073 A1 | 6/2010 | Louwsma et al. | |
| 2010/0164844 A1 | 7/2010 | Lin et al. | |
| 2010/0188720 A1 | 7/2010 | Nakamura et al. | |
| 2010/0201275 A1 | 8/2010 | Cok et al. | |
| 2010/0201283 A1* | 8/2010 | Kawata | G05F 3/08 315/287 |
| 2010/0213467 A1 | 8/2010 | Lee et al. | |
| 2010/0277400 A1 | 11/2010 | Jeong | |
| 2010/0328288 A1 | 12/2010 | Kimura et al. | |
| 2011/0032236 A1* | 2/2011 | Suzuki | G01D 3/08 345/211 |
| 2011/0122172 A1 | 5/2011 | Tanigawa et al. | |
| 2011/0133673 A1 | 6/2011 | Ryu et al. | |
| 2011/0242027 A1 | 10/2011 | Chang | |
| 2012/0242230 A1 | 9/2012 | Jin | |
| 2013/0016310 A1* | 1/2013 | Kanemitsu | H05B 33/0818 349/69 |
| 2014/0070188 A1 | 3/2014 | Park et al. | |
| 2014/0093252 A1 | 4/2014 | Yamashita et al. | |
| 2014/0097762 A1 | 4/2014 | Ide et al. | |
| 2014/0320475 A1 | 10/2014 | Shin et al. | |
| 2015/0008964 A1* | 1/2015 | Hopfgartner | G09G 3/006 327/109 |
| 2016/0109505 A1 | 4/2016 | Capodivacca et al. | |
| 2016/0262232 A1 | 9/2016 | Fukui et al. | |
| 2016/0345392 A1 | 11/2016 | Scenini et al. | |
| 2016/0345397 A1 | 11/2016 | De Cicco et al. | |
| 2017/0238385 A1 | 8/2017 | Sasaki et al. | |
| 2018/0151099 A1* | 5/2018 | Choi | H01L 27/1225 |

FOREIGN PATENT DOCUMENTS

| | | |
|---|---|---|
| CN | 101925946 A | 12/2010 |
| CN | 102176300 A | 9/2011 |
| CN | 103745985 A | 4/2014 |
| DE | 2752105 A1 | 5/1979 |
| DE | 3813664 A1 | 11/1988 |
| DE | 3931262 A1 | 3/1991 |
| DE | 202012104937 U1 | 1/2013 |
| EP | 0180479 A2 | 5/1986 |
| EP | 0282653 A1 | 9/1988 |
| EP | 0335553 A2 | 10/1989 |
| EP | 0504575 A2 | 9/1992 |
| EP | 0683526 A1 | 11/1995 |
| EP | 0683527 A1 | 11/1995 |
| EP | 0702347 A1 | 3/1996 |
| EP | 0785580 A2 | 7/1997 |
| EP | 0899620 A1 | 3/1999 |
| EP | 2065781 A2 | 6/2009 |
| EP | 2211386 A2 | 7/2010 |
| EP | 2387021 A1 | 11/2011 |
| EP | 2763174 A1 | 8/2014 |
| WO | 9001803 A1 | 2/1990 |
| WO | 9200196 A1 | 1/1992 |
| WO | 2004053824 A1 | 6/2004 |
| WO | 2005081810 A2 | 9/2005 |
| WO | 2006010615 A1 | 2/2006 |
| WO | 2006113922 A2 | 10/2006 |
| WO | 2006121914 A2 | 11/2006 |
| WO | 2010046638 A1 | 4/2010 |
| WO | 2010091380 A1 | 8/2010 |
| WO | 2013170460 A1 | 11/2013 |
| WO | 2014033671 A2 | 3/2014 |
| WO | 2014099499 A1 | 6/2014 |

OTHER PUBLICATIONS

Prosecution History from U.S. Appl. No. 14/718,956, dated from Jun. 22, 2016 through Jul. 12, 2017, 57 pp.

Prosecution History from U.S. Appl. No. 15/355,779, dated from Jul. 10, 2017 through Aug. 11, 2017, 22 pp.

Prosecution History from U.S. Appl. No. 14/719,035, dated from Jul. 7, 2016 through Aug. 8, 2017, 61 pp.

Office Action, in Chinese language, from counterpart Chinese Application 201610342069.1, dated Apr. 17, 2018, 6 pp.

* cited by examiner

DRIVING SEVERAL LIGHT SOURCES

CROSS-REFERENCE TO RELATED APPLICATION

This application is a continuation of U.S. patent application Ser. No. 14/719,035, filed on 21 May 2015 and entitled DRIVING SEVERAL LIGHT SOURCES.

BACKGROUND OF THE INVENTION

Embodiments of the present invention relate to device for driving several light sources. The light sources may in particular be LEDs arranged in a matrix structure (LED array).

SUMMARY

An embodiment relates to a device for driving several light sources,
- wherein the several light sources are arranged in a matrix structure;
- wherein the several light sources of the matrix structure are connected to a semiconductor device, wherein a portion of the semiconductor device corresponds to a light source of the matrix structure;
- wherein the portion of the semiconductor device comprises a diagnosis function which when activated is arranged for supplying an output diagnosis signal.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION OF THE PREFERRED EMBODIMENTS

Light sources, e.g., semiconductor light sources, LEDs (light emitting diodes), may be arranged together as an array. The array of light sources may be arranged on top of a semiconductor device (array) that is arranged as a control circuit for the light sources. The light sources may be mounted onto the semiconductor device. In case the semiconductor device provides a current source for each light source, such current source may have to be driven individually to allow controlling the respective light source.

Figure 1:
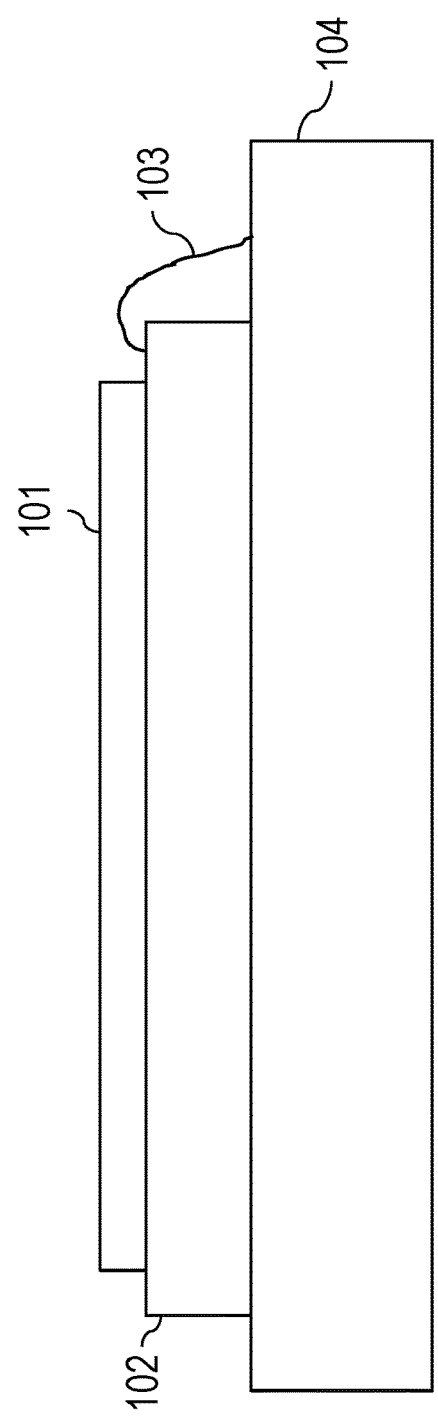
FIG. 1 shows an exemplary arrangement comprising an LED array which is placed on top of a semiconductor device.

FIG. 1 shows an exemplary arrangement comprising an LED array 101 which is placed on top of a semiconductor device 102. The semiconductor device 102 may be arranged on a printed circuit board (PCB) 104; it may be electronically connected via bond wires 103. The LED array 101 mounted on the semiconductor device 102 is also referred to as chip-on-chip assembly.

The semiconductor device 102 may comprise at least one of the following:
- current sources for the individual LEDs arranged on the LED array 101, in particular at least one current source for each LED;
- a communication interface for driving the LEDs and for management purposes;
- generation of at least one reference current; and
- diagnosis and protection functionality.

For such purpose, the semiconductor device 102 may comprise an array of silicon cells, wherein each silicon cell (also referred to as pixel cell) may comprise a current source, which may be directly connected to an LED of the LED array 101. In addition, the semiconductor device 102 may comprise a common circuitry.

Figure 2:
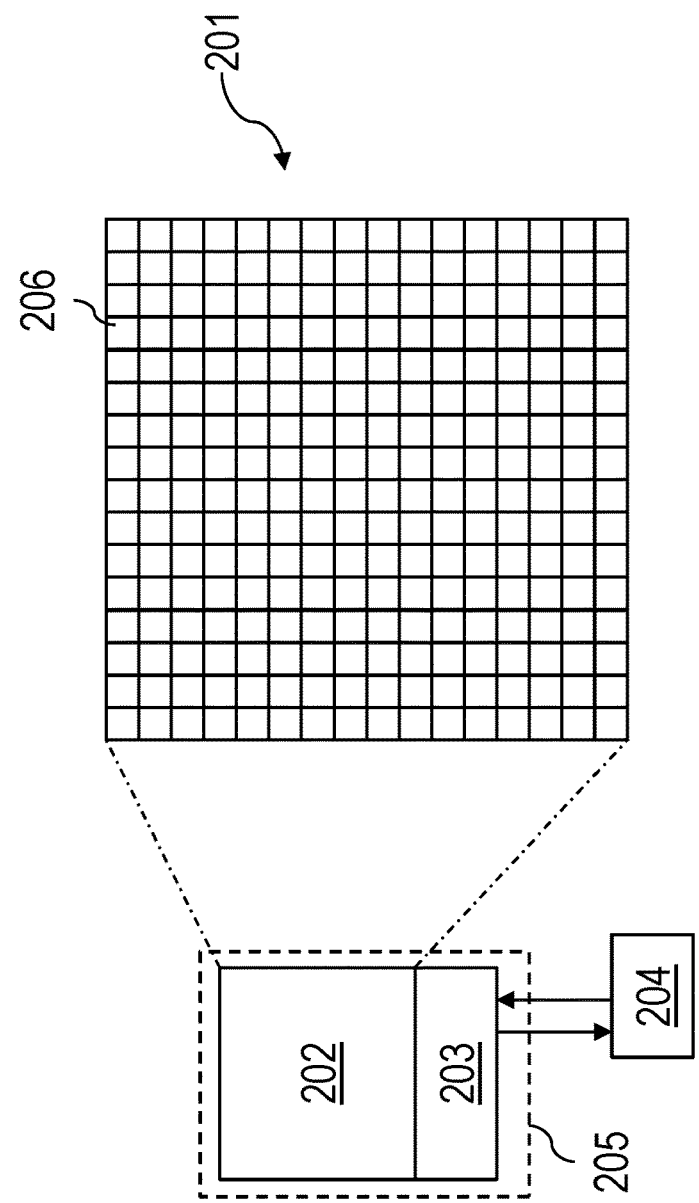
FIG. 2 shows an exemplary block diagram comprising a matrix of LEDs and a semiconductor device comprising an LED driver matrix and a common circuitry.

FIG. 2 shows an exemplary diagram comprising a matrix 201 of LEDs 206 (each pixel of the matrix may be represented by at least one LED) and a semiconductor device 205, which comprises an LED driver matrix 202 (i.e. a portion of the semiconductor device that is associated with one pixel of the LED array 101) and a common circuitry 203. The semiconductor device 205 may be connected to a serial interface 204. The respective LEDs 206 of the matrix 201 may be controlled via the serial interface 204. The matrix 201 may be arranged on top of the LED driver matrix 202. The LED driver matrix 202 may be part of the semiconductor device 102 as shown in FIG. 1 and it may comprise a pixel cell area (also referred to as "pixel cell") for each LED 206 of the matrix 201. It is an option that the LED driver matrix 202 has (e.g., substantially) the same area size as the matrix 201. In particular, the pixel cell area of the LED driver matrix 202 may have (substantially) the same surface area as the LED 206. The LEDs 206 of the matrix 201 may be directly connected to the pixel cells of the LED driver matrix 202. The matrix 201 may in particular be arranged on top of the LED driver matrix 202.

The common circuitry 203 may in particular comprise a serial interface for accessing the LEDs of the matrix 201, e.g., one register for configuration purposes, a reference current generator, a reference voltage generator and a temperature sensor.

The matrix 201 may comprise an arbitrary number of LEDs (pixels) arranged in columns and rows. The matrix 201 may comprise, e.g., 256 or 1024 LEDs. In the example shown in FIG. 2, the matrix 201 comprises 16 rows and 16 columns of LEDs 206 amounting to a total of 256 LEDs.

It is noted that LED is mentioned as an example for a light source. It may be an option to use any kind of light source, in particular semiconductor light source. It is another option that each light source may be a module comprising at least two semiconductor light sources.

The common circuitry 203 may be arranged in an area adjacent or distant to the LED driver matrix 202.

In an exemplary application, each pixel of the LED array 101 may consume a surface area amounting to, e.g., less than 150 μm². This value is only an exemplary value for an area. Any area suitable for a predetermined resolution of the LED array 101 may be selected. The semiconductor light source may be arranged in the middle of each pixel cell. Adjacent pixel cells may have a gap between light sources amounting to less than 150 μm. Each LED may have one contact connected to the LED driver matrix 202 and one contact connected to a common contact, e.g., GND. This is an exemplary scenario; other dimensions, distances and connections may apply accordingly.

With each LED being mounted directly on top of the semiconductor device, each current source is placed in an area defined by the surface area of the pixel cell. In the example provided above, the area amounts to $$150 \; \mu m \sim 150 \; \mu m = 0.022500 \; mm^2.$$

For increasing the resolution in x- and y-dimensions (e.g., 0.5°) of the light at long distance and for avoiding extra mechanical components for beam leveling adjustment, a short pitch between the pixel cells is beneficial. In the example provided above, the pitch between pixel cells may be less than 150 μm.

Due to the compact arrangement, a high amount of heat sources may generate different temperatures, which may influence temperature gradients and hence lead to a mismatch between pixels.

In addition, the output of each current source per pixel cell may not be directly accessible as the LED driver matrix is directly connected to the LEDs.

Hence, a solution is required that provides at least one of the following:
  a current source that provides current to the individual LED, which allows switching the LED on or off with high accuracy, optionally providing over-current protection;
  a diagnostic functionality capable of detecting an open-load and a short to ground of the output channel;
  a low mismatch between different pixels, i.e. between different current sources.

Figure 3:
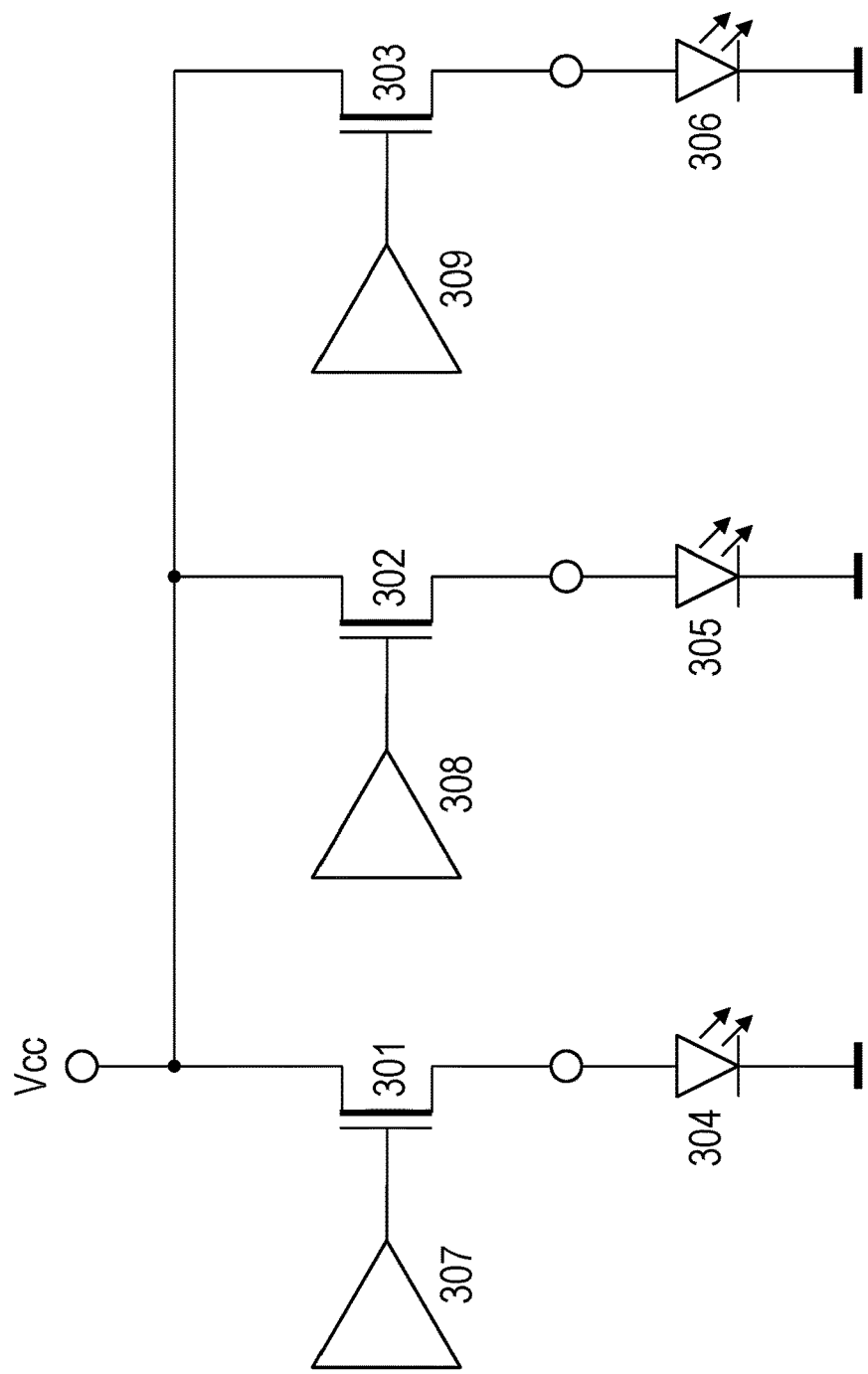
FIG. 3 shows high-side current sources, each of which being arranged on the LED driver matrix on top of which LEDs are mounted.

FIG. 3 shows high-side current sources 301 to 303, each of which being arranged on the LED driver matrix on top of which LEDs 304 to 306 are mounted. In this scenario, the LED 304 is arranged on top of the current source 301, the LEI) 305 is arranged on top of the current source 302 and the LED 306 is arranged on top of the current source 303.

Each current source 301 to 303 may be an NMOS power stage with its drain connected to a supply voltage Vcc and with its source connected toward the respective LED 304 to 306. The gate of each NMOS power stage may be controlled via an error amplifier 307 to 309.

The respective error amplifier 307 to 309 may be used to control the output current using an internal reference current. The error amplifier 307 to 309 can be enabled by a digital or by an analog signal.

An LED driver matrix may thus comprise a huge number of current sources and/or switches on the area available for a pixel cell (in case the LED driver matrix is below the LED array).

Examples presented herein in particular show how an efficient solution for the LED array and the underlying LED driver matrix may be realized even if the LED driver matrix is arranged on a silicon semiconductor device (e.g., single chip). Examples provided in particular cope with a high number of heat sources as well as heat gradients between current sources of the pixel cells.

Examples presented herein allow providing an LED driver matrix comprising in particular at least one of the following:
  a communication interface for controlling the drivers for each pixel cell;
  an output current regulation with self-protection against over-current;
  an open-load and short to ground diagnostic functionality; and
  a low temperature sensitivity.

This may in particular be achieved by distributing a control logic between a common circuitry and the LED driver matrix, both integrated on a semiconductor device. The common circuitry may be arranged adjacent to the LED driver matrix and the LED driver matrix may take the same surface area than the LED array, which can be arranged on top of the LED driver matrix as explained above.

As an option, the common circuitry may be arranged in an area adjacent or distant to the LED driver matrix.

A challenge is how to efficiently drive the current sources, wherein one current source is placed (or associated with) a pixel cell. As shown in the example described above, the distance between two pixel cells (e.g., less than 150 μm) may set forth limiting restrictions, which makes it difficult to electrically connect all current sources that are arranged below their associated light sources such that they can be driven by the common circuitry of the semiconductor device.

Figure 4:
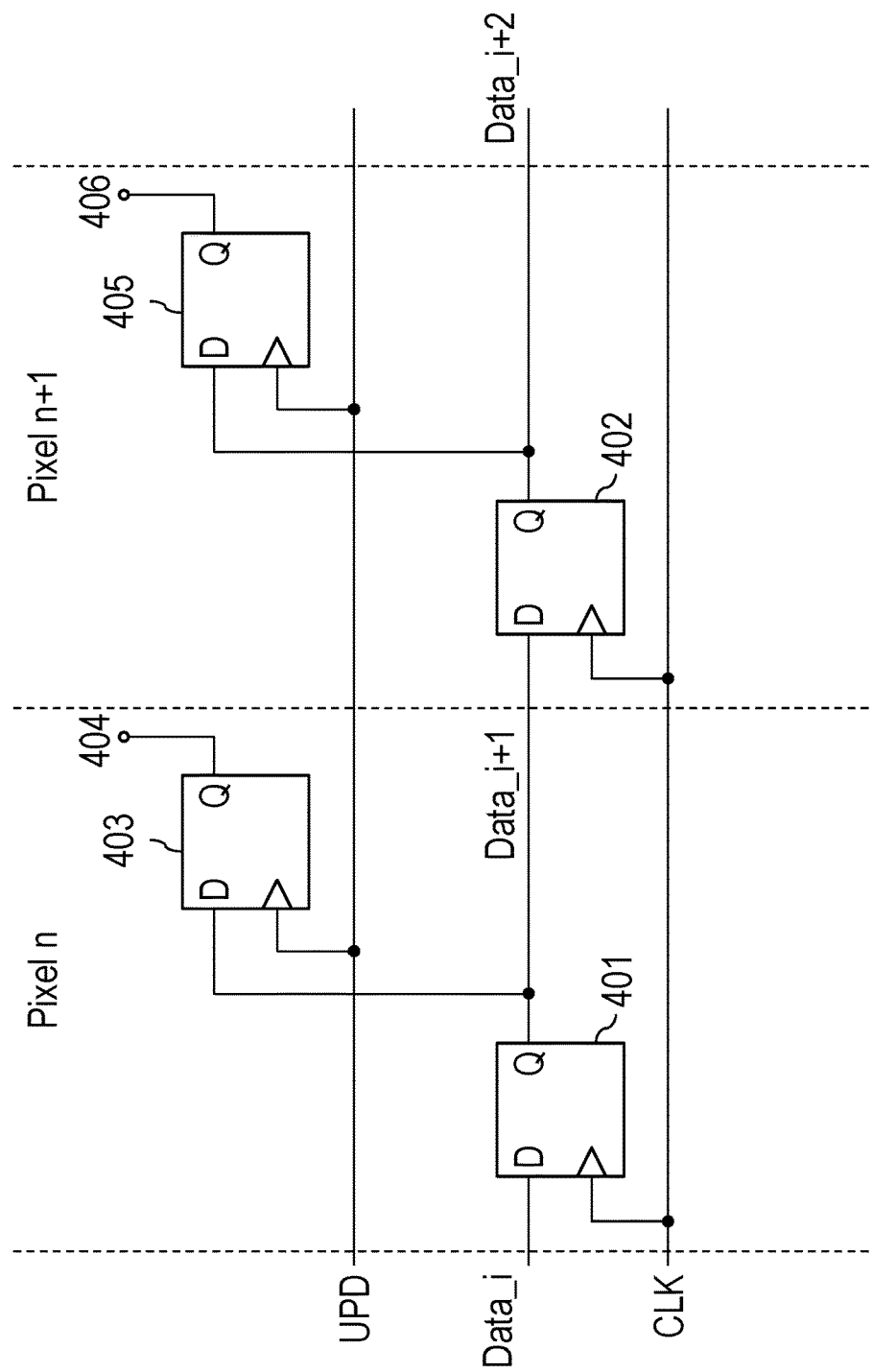
FIG. 4 shows an exemplary pixel addressing circuitry that may be arranged on the semiconductor device for two pixel cells n and n+1.

FIG. 4 shows an exemplary circuitry that may be arranged on the semiconductor device for two pixel cells n and n+1. This example suggests that the common circuitry supplies an update signal UPD, a data signal Data_i and a clock signal CLK. In the example, the pixel cell n provides a data signal Data_i+1 to the pixel cell n+1 and the pixel cell n+1 provides a data signal Data_i+2 to a subsequent pixel cell (not shown).

The data signal Data_i is a sequence of binary signals (e.g., "0" and "1") that are conveyed to a shift register. Each cell of the shift register may comprise a D-flip-flop, i.e. a D-flip-flop 401 for pixel n and a D-flip-flop 402 for pixel n+1. The data signal Data_i is connected to the D-input of the D-flip-flop 401, the Q-output of the D-flip-flop 401 is connected to the D-input of the a-flip-flop 402. Both D-flip-flops 401, 402 are also driven by the clock signal CLK.

Hence, a sequence of "0" and "1" values may be conveyed to the D-flip-flops 401, 402, wherein with each clock cycle (rising edge) of the clock signal CLK, the actual value stored in the D-flip-flop 401 is shifted to the subsequent D-flip-flop 402 and the next value provided by the data signal Data_i is stored in the D-flip-flop 401.

According to the example shown in FIG. 4, a bit sequence of first 0, then 1 is—after two clock cycles—stored in the D-flip-flops 401, 402 such that the D-flip-flop 401 has a value "1" and the D-flip-flop 402 has the value "0".

A light source, e.g., LED, for pixel n is driven via a terminal 404 of a register, e.g., a D-flip-flop 403, and a light source, e.g. LED, for the pixel n+1 is driven via a terminal 406 of a register, e.g., a D-flip-flop 405. The D-input of the D-flip-flop 403 is connected to the Q-output of the D-flip-flop 401 and the D-input of the D-flip-flop 405 is connected to the Q-output of the D-flip-flop 402. The enable (or clock) inputs of both D-flip-flops 403, 405 are connected to the update signal UPD. When the update signal UPD becomes "1" the value stored in the D-flip-flop 401 becomes visible at the Q-output of the D-flip-flop 403 and hence is used to drive the light source for this pixel n. Accordingly, the value stored in the D-flip-flop 402 becomes visible at the Q-output of the D-flip-flop 405 and hence is used to drive the light source of pixel n+1.

Hence, the shift register exemplarily shown in FIG. 4 comprises two cells, wherein the cell for pixel n comprises the D-flip-flop 401 and the register 403 and the cell for pixel n+1 comprises the D-flip-flop 402 and the register 405. The register may be implemented as a flip-flop, in particular as a D-flip-flop.

FIG. 4 shows only an exemplary excerpt of a sequence of two pixel cells. This approach, however, may be applied to a sequence of more than two pixel cells, e.g., a column or a row of a matrix of pixels. In addition, several rows or columns may be connected and represented by an even longer shift register. Insofar, the shift register can be used for providing a data signal to all pixels of a column or line or even matrix and to update the column, line or matrix at once.

The frequency of the clock signal CLK may advantageously be high enough to fill the shift registers for such sequence of pixels before the update signal UPD is activated and before the values stored at that time in the respective shift register are used to control the pixels of this sequence, e.g., column or row of the matrix of pixels. Hence, a high refresh rate for each pixel may result in a high resolution of a PWM dimming. Therefore, a high clock frequency may be advantageous to store the information in the flip-flop of the shift-register before triggering the update signal.

Advantageously, by providing registers (e.g., D-flip-flops according to FIG. 4) in daisy-chain manner (one pixel driving the next one) and arrange those registers together with the respective pixel cells, a single line suffices to convey the data signal Data_i to a sequence of pixels, whereas otherwise each pixel would require a separate connection to convey the data signal for controlling this pixel.

It is noted that any sort of register or memory may be used to achieve the result described above. The register may be a flip-flop, a latch, register or any other element with a memorizing functionality.

Figure 5:
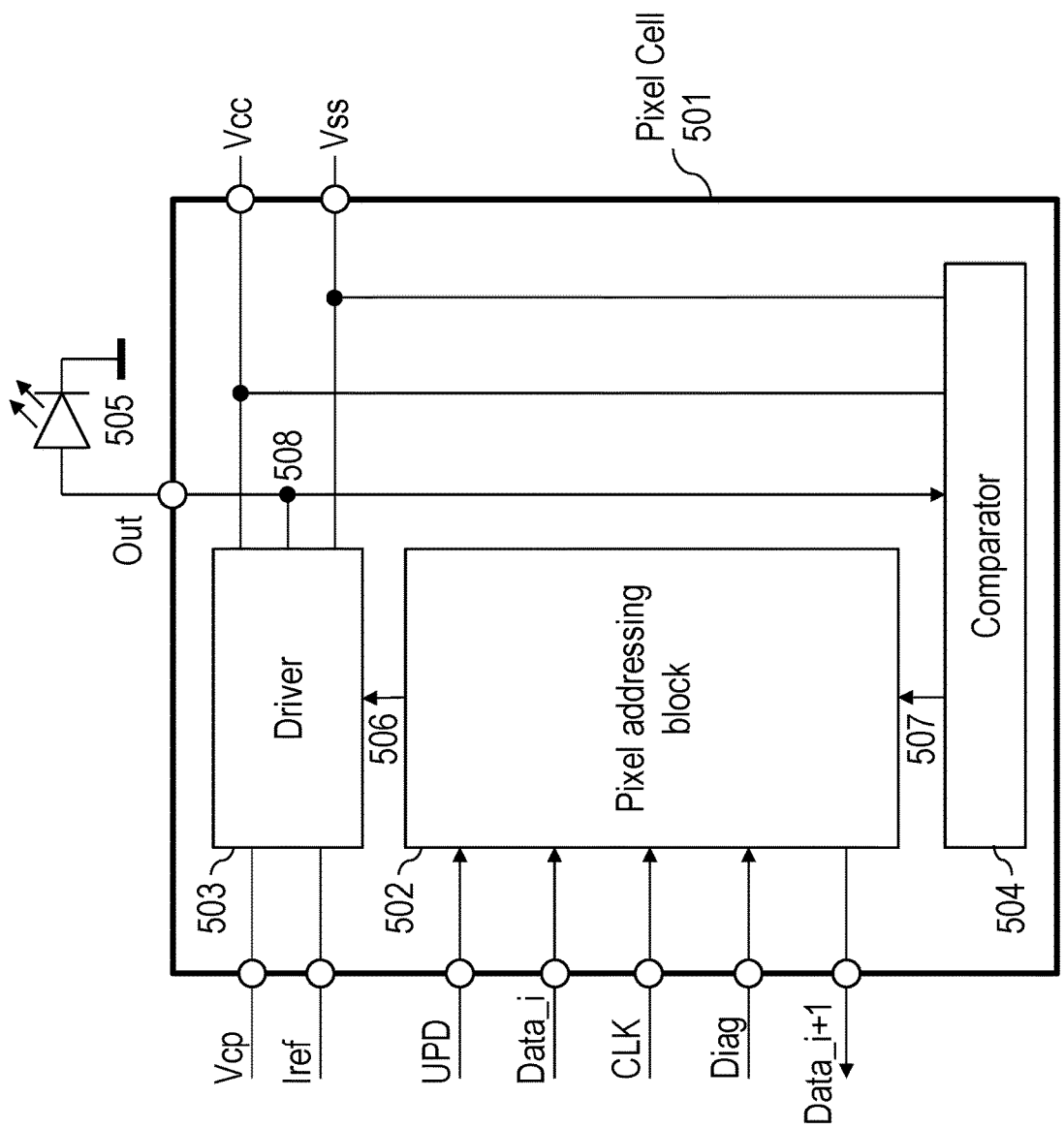
FIG. 5 shows a schematic block diagram of a pixel cell comprising a pixel addressing block, a driver and a comparator.

FIG. 5 shows a schematic block diagram of a pixel cell 501 comprising a pixel addressing block 502, a driver 503 and a comparator 504. The comparator 504 may be optionally used for diagnostic purposes.

The pixel cell 501 may correspond to a portion of the semiconductor device having the surface area of a pixel of the LED array. The pixel cell 501 may provide a terminal Out that can be connected to the light source, e.g., an LED 505 of the LED array. The light source may be directly mounted onto the semiconductor device, e.g., above the pixel cell 501. Hence, the LEI) mounted on the semiconductor device can be regarded as an integral part of the pixel cell. As an option, the term pixel cell may refer to the piece of the semiconductor device that is associated with a single LED, which may be mounted onto this piece of the semiconductor device. It is noted that the pixel cell 501 may be part of the semiconductor device 102, in particular the LED driver matrix 202. In one embodiment, the pixel cell 501 may correspond to the LED driver matrix 202 according to FIG. 2.

The driver 503 is supplied by a voltage Vcp and a voltage Vcc. Also, a reference current Iref is conveyed to the driver 503. The reference current Iref may be supplied by the common circuitry 203, e.g., via a current source arranged with this common circuitry 203. The driver 503 is connected to ground (also referred to as Vss).

In addition, the driver 503 receives a signal 506 from the pixel addressing block 502 and supplies its output signal to drive the respective light source via a node 508. The node 508 is connected to the terminal Out.

The pixel addressing block 502 obtains the update signal UPD, the data signal Data_i and the clock signal CLK. It provides the data signal Data_i+1 for a subsequent pixel cell (or for the common circuitry if there is no subsequent pixel cell).

Further, the pixel addressing block 502 supplies the signal 506 to the driver 503. The basic functionality of the pixel addressing block 502 is explained with regard to FIG. 4 and FIG. 7.

If the pixel cell 501 is equipped with a diagnosis functionality, a diagnosis signal Diag may be provided to the pixel addressing block 502 of the pixel cell 501. In such scenario, the node 508 is also connected to the comparator 504 and a result processed by the comparator 504 is conveyed as a signal 507 to the pixel addressing block 502. The comparator 504 is also connected to the voltage Vcc and to ground Vss.

As an option, all connections to/from the pixel cell 501 may be with the common circuitry, except for the terminal Out, which is connected to the LED 505 that may be mounted on top of the pixel cell 501.

Figure 6:
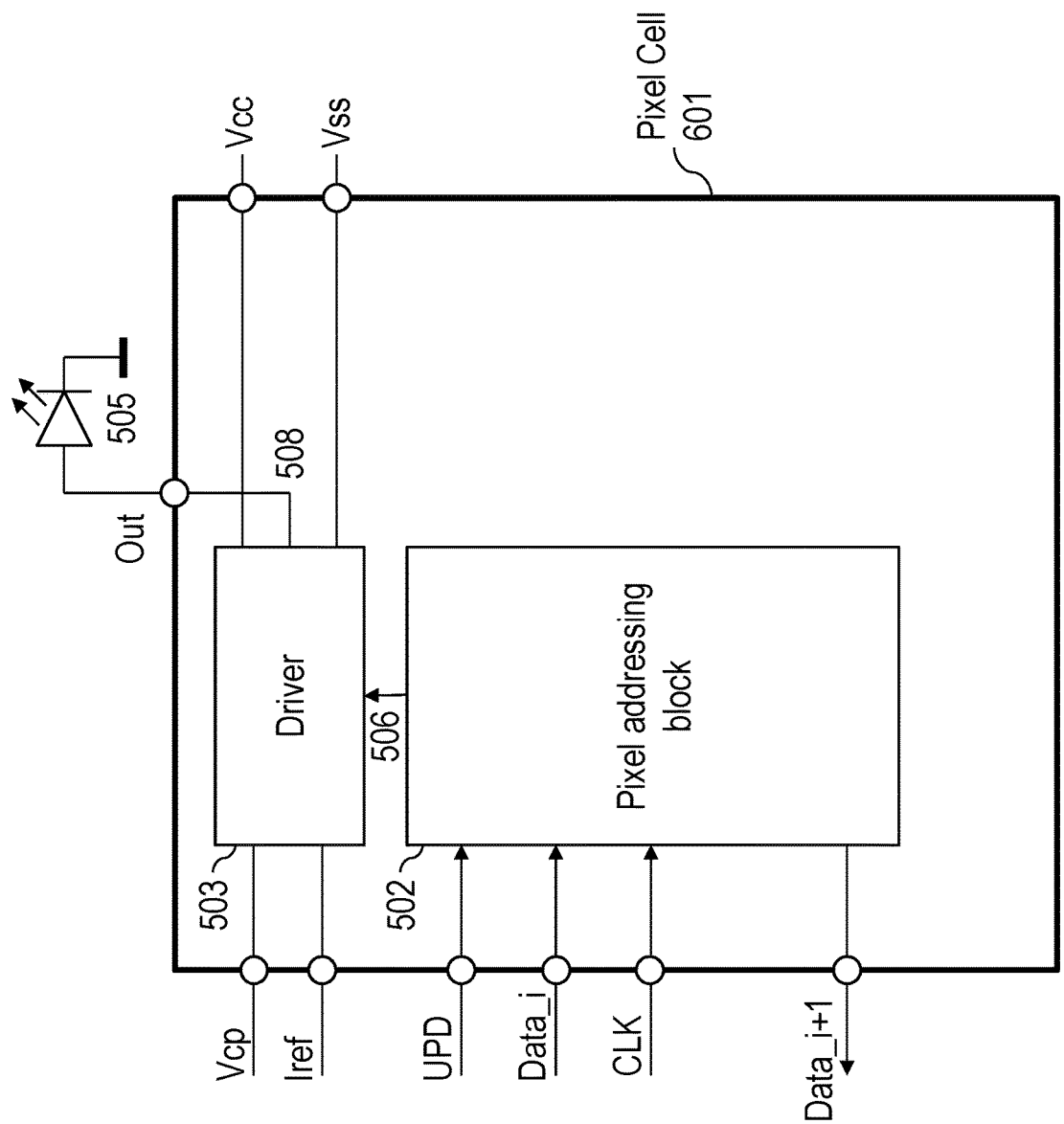
FIG. 6 shows an exemplary block diagram of a pixel cell, which is based on the pixel cell shown in FIG. 5, but does not comprise a diagnosis functionality.

FIG. 6 shows an exemplary pixel cell 601, which is based on the pixel cell 501, but does not comprise the diagnosis functionality mentioned above. Insofar, the pixel cell 601 does not have a comparator 504 and there is no diagnosis signal Diag supplied to the pixel addressing block 502.

Hereinafter, the pixel addressing block 502, the driver 503 and the comparator 504 are explained in more detail.

Figure 7:
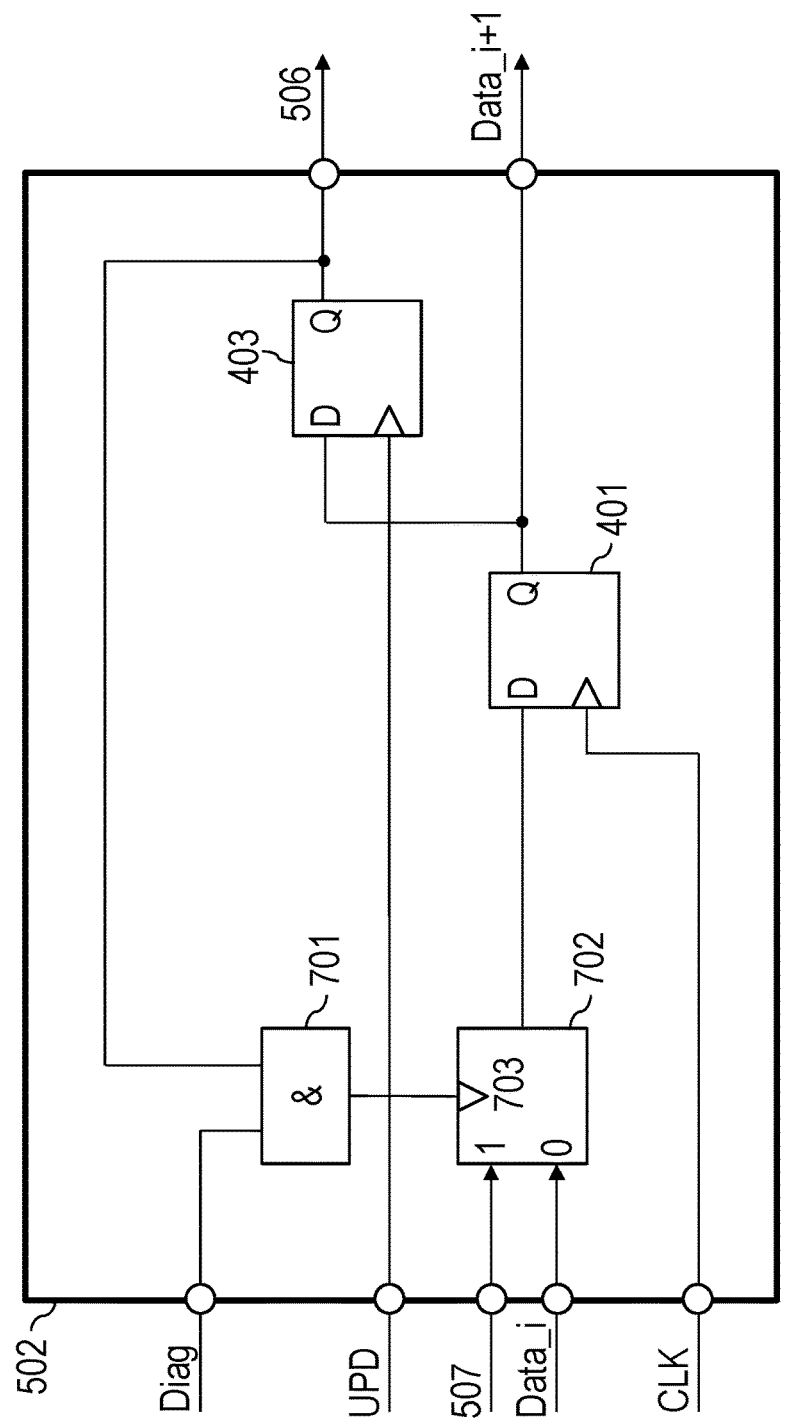
FIG. 7 shows an exemplary implementation of the pixel addressing block.

FIG. 7 shows an exemplary implementation of the pixel addressing block 502. Reference is also made to FIG. 4 above, which explains the shift registers operating between several pixel cells in more detail.

In addition to FIG. 4, the pixel addressing block of FIG. 7 comprises a diagnosis functionality. The signal 507 from the comparator 504 is conveyed to an entry "1" of a multiplexer 702, whereas the signal Data_i is conveyed to an entry "0" of the multiplexer 702. Either entry "0" or "1" of the multiplexer 702 are selected via an input 703 of the multiplexer. The output of the multiplexer 702 is connected to the D-input of the D-flip-flop 401. Depending on a digital value supplied to the input 703, one of the multiplexer's inputs is connected to the D-input of the D-flip-flop 401.

If the value supplied to the input 703 is "0", the signal Data_i is conveyed to the D-input of the D-flip-flop 401, if the value is "1", the signal 507 is conveyed to the D-input of the D-flip-flop 401.

The diagnosis signal Diag is conveyed to the first entry of an AND-gate 701 and the second entry of the AND-gate 701 is connected to the Q-output of the D-flip-flop 403. The output of the AND-gate 701 is connected with the input 703 of the multiplexer 702.

According to this example, if the signal Diag is "1" and the Q-output of the D-flip-flop 403 is "1", the signal 507 is selected by the multiplexer 703 to be connected to the D-input of the D-flip-flop 401. Otherwise, i.e. in case at least one of the inputs of the AND-gate 701 is "0", the signal Data_i is selected by the multiplexer 703 to be connected to the D-input of the D-flip-flop 401.

The Q-output of the D-flip-flop 403 conveys the signal 506 to the driver 503. The Q-output of the D-flip-flop 401 provides the subsequent data signal Data_i+1.

Figure 8:
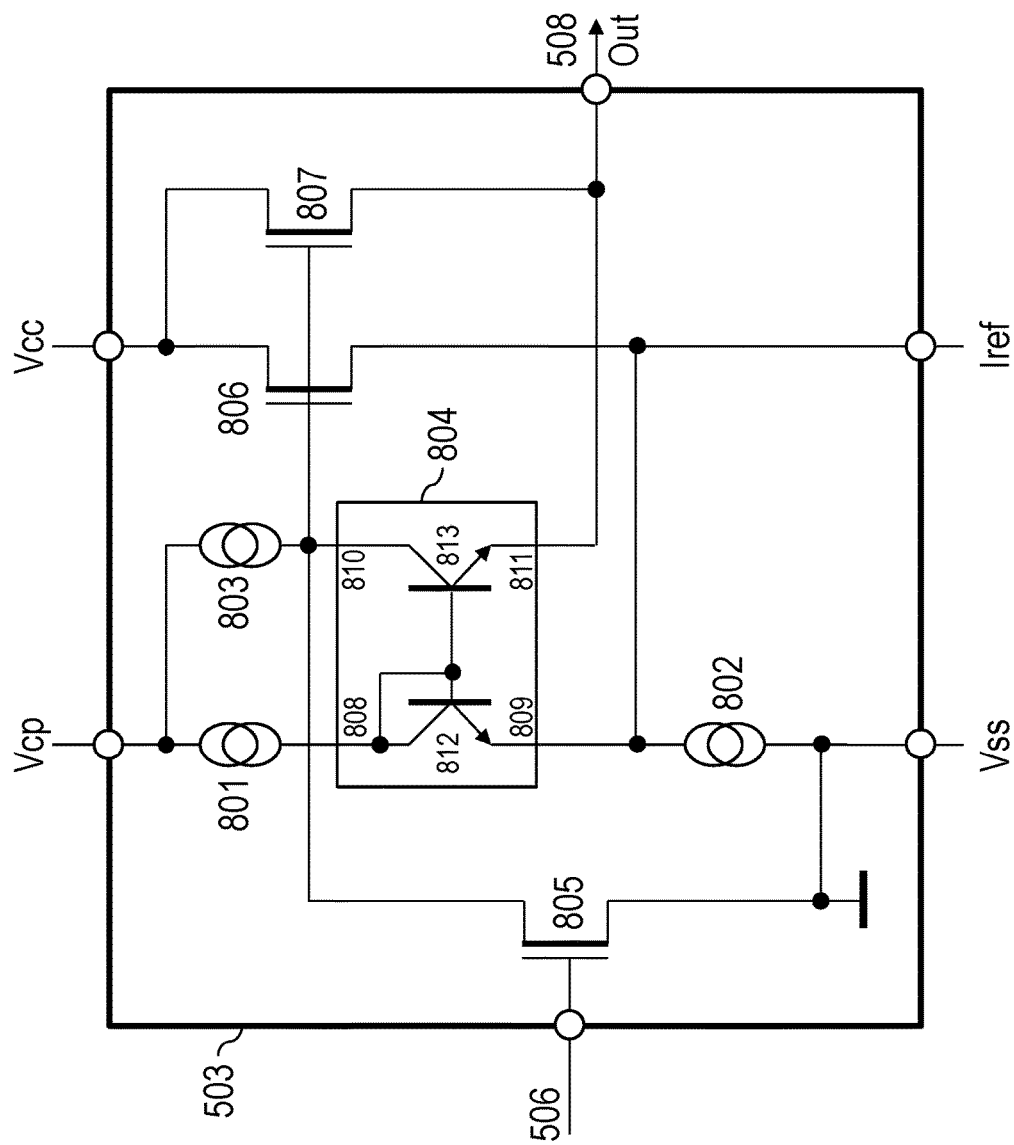
FIG. 8 shows an exemplary implementation of the driver.

FIG. 8 shows an exemplary implementation of the driver 503. The signal 506 from the pixel addressing block 502 is conveyed to the gate of an n-channel MOSFET 805. The drain of the MOSFET 805 is connected to the gate of an n-channel MOSFET 806 and to the gate of an n-channel MOSFET 807. The MOSFET 806 corresponds to a sense stage and the MOSFET 807 corresponds to a power stage of the driver 503.

The source of the MOSFET 805 is connected to ground Vss. The voltage Vcp is conveyed via a current source 801 to a terminal 808 of a current mirror 804. Also, the voltage Vcp is connected via a current source 803 to a terminal 810 of the current mirror 804. The terminal 810 is connected to the gate of the MOSFET 806. A terminal 809 of the current mirror 804 is connected via a current source 802 to ground Vss. A terminal 811 of the current mirror 804 is connected to the node 508, which is also connected to the terminal Out.

The current sources 801 to 803 each reflects a bias current.

The current mirror 804 comprises two npn-transistors 812 and 813. The collector of the transistor 812 is connected to the terminal 808 and to the base of the transistor 812 as well as to the base of the transistor 813. The emitter of the transistor 812 is connected to the terminal 809. The collector of the transistor 813 is connected to the terminal 810 and the emitter of the transistor 813 is connected to the terminal 811.

The voltage Vcc is connected to the drain of the MOSFET 806 and to the drain of the MOSFET 807. The reference current Iref is conveyed to the source of the MOSFET 806 and to the terminal 809 of the current mirror 804. The source of the MOSFET 807 is connected to the node 508.

The MOSFET 807 acts as an NMOS power stage and the MOSFET 806 acts as an NMOS sense cell. The gate-source voltage of the MOSFET 807 is regulated via the current mirror 804 based on the reference current Iref and a predetermined KILIS-factor amounting, e.g., to 50).

The KILIS-factor refers to a ratio between a load current and a sense current. The load current is KILIS-times higher than the sense current.

The driver topology may be beneficial for reducing power dissipation of the cell by providing a low voltage drop across the power stage at a high current.

The reference current Iref may be provided by the common circuitry for all pixel cells. Hence, the reference current Iref is generated remote to the heat sources of the pixel cells. The current may be mirrored per pixel cell, per row of pixel cells and/or per column of pixel cells.

Thus, generating the reference current Iref for the current mirror 804 outside the driver 503 bears in particular the advantage that the area required on the semiconductor device required for the pixel cell can be further reduced. It is another advantage that the reference current Iref is substantially identical for all the pixel cells.

Hence, any influence of the power dissipation of the pixel cells has a limited impact on adjacent pixel cells resulting in a high accuracy of the output current per pixel cell.

It is an option that the power stage is designed with a KILIS-factor amounting to 4:200, i.e. the NMOS sense stage comprises 4 cells with each of these cells being mirrored with 50 cells of the power stage. These 4 cells may be arranged in the layout in a cross-coupled configuration to reduce the impact of different temperature gradients.

The driver shown in FIG. 8 also provides high precision with low offset. It consumes only a small area on the chip and it allows for protection against over-current in case of a short-circuit to ground Vss. Hence, when a short-circuit appears at the terminal Out, the current mirror 804 that provides the reference current is not able to work, the MOSFET 807 (power stage) is pulled down.

Figure 9:
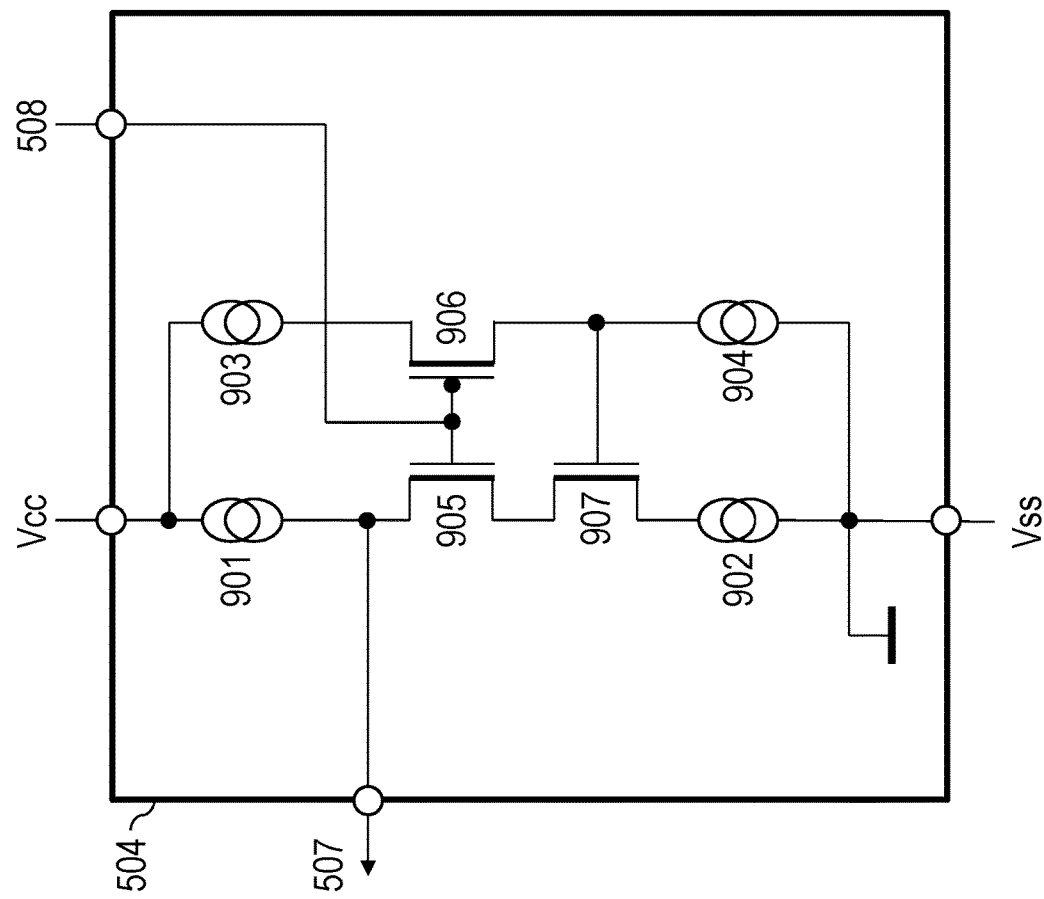
FIG. 9 shows an exemplary implementation of the comparator.

FIG. 9 shows an exemplary implementation of the comparator 504. The comparator 504 also provides an EXCLUSIVE-OR functionality.

The node 508 is also connected to the comparator 504, i.e. to the gate of an n-channel MOSFET 905 and to the gate of a p-channel MOSFET 906 (both gates are connected with each other). The signal 507 is supplied via the drain of the MOSFET 905. The drain of the MOSFET 905 is connected via a current source 901 to the voltage Vcc. The drain of the MOSFET 906 is connected via a current source 903 to the voltage Vcc. The source of the MOSFET 905 is connected to the drain of an n-channel MOSFET 907. The source of the MOSFET 907 is connected via a current source 902 to ground Vss. The source of the MOSFET 906 is connected to the gate of the MOSFET 907. Also, the source of the MOSFET 906 is connected via a current source 904 to ground Vss.

The current sources 901 to 904 each reflect bias currents.

The diagnosis functionality shown in the pixel addressing block 502 according to FIG. 7 in combination with the comparator of FIG. 9 allows for each pixel cell to determine whether there is an open-load or a short-circuit to ground situation.

The comparator 504 may be arranged as a window comparator capable of detecting both conditions, i.e. open-load as well as short-circuit. Advantageously, the comparator 504 only requires a small area on the chip. The pixel addressing block 502 is arranged to select via the multiplexer 702 the output 507 of the comparator 504 instead of the data signal Data_i.

Hence, the status of the output 507 (indicating whether the pixel cell works within predefined parameters or shows an open-load or a short-circuit condition) is loaded into the shift register and can be read from the shift register (after a predetermined number of clock cycles).

For example, a data frame of 256 bits with only the pixel which has to be checked is fed into the shift register and the diagnosis signal Diag is enabled (i.e. set to "1") for this pixel cell to be checked. The multiplexer 702 of this pixel cell does not convey the data signal Data_i of the previous pixel cell, but the output 507 of the comparator 504. Another data frame of 256 bits is supplied to convey the diagnosis information from the shift register 401 to the common circuitry and to a microcontroller that may process this diagnosis information.

Hence, it can be determined whether the pixel cell to be diagnosed works within predefined parameters (indicated by logic "0") or suffers from open-load or a short-circuit to ground issues (indicated by logic "1").

This routine may be repeated 256 times to check all the pixel cells.

The comparator 504 provides a "high" digital logic information in case the output voltage is too high (open load) or too low (short-circuit to ground). The reference voltages used are the threshold voltage of the MOSFET 905 and of the MOSFET 906.

As soon as the voltage at the node 508 (which corresponds to the voltage across the LED 505 is lower than a predetermined threshold, the MOSFET 905 is switched off and the current provided by current source 901 pulls up the signal 507 results in a logic "1" to be stored in the D-flip-flop 401.

As soon as the voltage at the node 508 is higher than a voltage Vcc-Vth (Vth being the threshold voltage, in this example of the MOSFET), the MOSFET 906 is switched off and the current provided by the current source 904 pulls down the gate of the MOSFET 907 (thereby being switched off) and therefore the current of the current source 901 pulls up the signal 507 resulting in a logic "1" to be stored in the D-flip-flop 401.

In normal operation (i.e. the voltage at the node 508 being not zero or too high), the MOSFET 905 is switched on and the MOSFET 906 is switched on, which results in the MOSFET 907 being switched on. The current provided by the current source 902 is higher than the current provided by the current source 901 to pull down the signal 507 to logic "0". Also, the current by the current source 903 is higher than the current provided by the current source 904 so that the MOSFET 907 is on and to allow the left branch to enable (pulling down the signal 507). Hence the signal logic "0" is stored in the D-flip-flop 401.

Renee, with only a few MOSFETs the comparator 504 is able to generate the signal 507 amounting to logic "1" in case the voltage at the node 508 is lower than the predetermined threshold (which allows detecting of a short-circuit to ground) or in case the voltage at the node 508 is higher than the voltage Vcc-Vth (which allows detecting of an open load condition).

Hence, each pixel of the matrix of LEDs (see FIG. 2) can be checked in a fast and efficient manner.

The examples suggested herein may in particular be based on at least one of the following solutions. In particular combinations of the following features could be utilized in order to reach a desired result. The features of the method could be combined with any feature of the device, apparatus or system or vice versa.

A device is suggested for driving several light sources,
wherein the several light sources are arranged in a matrix structure;
wherein the several light sources of the matrix structure are connected to a semiconductor device, wherein a portion of the semiconductor device corresponds to a light source of the matrix structure,
wherein the portion of the semiconductor device comprises a diagnosis function which when activated is arranged for supplying an output diagnosis signal.

In an embodiment, the diagnosis function is activated via a diagnosis signal applied to the portion of the semiconductor device.

In an embodiment, the diagnosis signal is applied to a multiplexer to switch between the diagnosis function and a normal function of operation.

In an embodiment, the device comprises a comparator that is arranged for determining the output diagnosis signal as follows:
the output diagnosis signal has a first value in case a voltage for driving the light source is below a predetermined first threshold or above a predetermined second threshold;
the output diagnosis signal has a second value in case the voltage for driving the light source is not below the predetermined first threshold or above a predetermined second threshold.

In an embodiment, the output diagnosis signal is provided at an output of the portion of the semiconductor device for driving the light source.

In an embodiment, each portion of the semiconductor device comprises the diagnosis function.

In an embodiment, the device further comprises:
a shift register comprising at least two cells, wherein an output of each cell controls one of the several light sources;
wherein the at least two cells are connected in series and are driven by a clock signal;
wherein each cell of the shift register comprises a flip-flop and a register;
wherein the output of the flip-flop is connected with the input of the register;
wherein the register is arranged to store the output of the register based on an update signal and wherein the output of the register controls one of the light sources;
wherein the flip-flops of the at least two cells are filled with a data signal based on the clock signal;
wherein after a predetermined number of cycles of the clock signal the update signal is conveyed to the registers driving the light sources according to the values stored in the flip-flops of the cells; and
wherein the output diagnosis signal is stored in the cell of the shift register in case the diagnosis function is activated.

The flip-flop (also referred to as latch) is a circuit that has two stable states and can be used to store state information. The circuit can be made to change state by signals applied to one or more control inputs and it may have at least one output. The flip-flop is a basic storage element that can be used in a sequential logic.

It is noted that the register can be realized as a flip-flop. The register may be any means to store information; the information stored may in particular (only) be used to control the light source, wherein the light source may be directly or indirectly connected to the output of the register. For such purpose, the register may comprise an input to which the update signal may be applied; an active update signal may then result in the input of the register to be conveyed to its output for controlling the light source connected to the output of the register accordingly. Applying the update signal to several registers at the same time, leads to controlling several light sources, each supplied via an output of a separate register at such time; the output to drive the respective light sources stem from the flip-flops to which the data signal has been conveyed via several cycles of the clock signal.

It is further noted that the flip-flops of the shift register are filled with the data signal based on the clock signal as follows: the data signal comprises a stream of "0" and "1" values, where are sequentially conveyed to the shift register: a first clock signal allows entering the first value of the data signal in the first flip-flop of the shift register. With a second clock signal, the first value of the data signal is conveyed from the first flip-flop to the second flip-flop of the shift register and the second value of the data signal is stored in the first flip-flop. Hence, the stream of "0" or "1" values is subsequently conveyed through the at least two flip-flops of the shift registers, wherein each clock cycle, e.g., a rising edge of the clock signal, triggers the shift operation.

Hence, the approach allows for a stacked matrix device comprises a (shift)-register functionality for individually accessing pixels of a matrix, each pixel comprising a light source. This shift-register allows a serial-to-parallel conversion in addressing the pixels based on the clock signal.

In an embodiment, the flip-flop is a D-flip-flop and the register is an additional D-flip-flop, wherein the update signal is conveyed to the clock terminal of the additional D-flip-flop.

In an embodiment, the matrix comprises at least two rows and at least two columns.

In an embodiment, a cell of the shift registers is associated with each light source of the matrix.

In an embodiment, the cells of the shift register are part of the semiconductor device, on top of which the matrix structure comprising the several light sources is arranged.

In an embodiment, the semiconductor device comprises a driver for each light source of the matrix structure.

In an embodiment, the driver for each light source of the matrix structure comprises a current mirror that is supplied with at least one reference current.

In an embodiment, at least one reference current is generated at a common area of the semiconductor device and supplied to all drivers for the light sources of the matrix structure.

In an embodiment, the cell of the shift register and the driver associated with a single light source of the matrix are arranged on a surface area having a size that corresponds to the size of the surface area of the single light source of the matrix.

Hence, the driver and the cell of the shift register that are in place for the individual light source may be arranged on the semiconductor device below the light source but not requiring more than the surface area on the semiconductor device that corresponds to the surface area of this light source. This allows providing the matrix of light sources (e.g., LED matrix mounted on top of the semiconductor device and connecting the light sources of the matrix structure to their respective cells.

The solution presented herein hence allows an area efficient implementation of the components on the semiconductor device that are required to operate the single light source of the matrix structure.

The driver may comprise a current source and/or a current mirror for driving an individual light source.

The cell of the shift register may be part of a pixel addressing block as described herein.

In an embodiment, the semiconductor device comprises a common circuitry for the light sources of the matrix structure.

In an embodiment, the common circuitry is arranged in an area adjacent to the shift register.

In an embodiment, each light source comprises at least one semiconductor light source, in particular at least one LED.

In an embodiment, the device is an integrated circuit, in particular realized as a single chip.

A system comprising the device as described herein is provided, wherein such device is a semiconductor device comprising a pixel cell circuitry on a first area on top of which the matrix structure comprising a matrix of light sources is connected and a common circuitry on a second area, which is arranged adjacent to the first area, wherein the common circuitry is arranged for operating and/or supplying the pixel cell circuitry.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the an that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A device for driving a plurality of LEDs (Light Emitting Diodes), comprising:
   a semiconductor device comprising a plurality of portions,
      wherein each portion of the plurality of portions corresponds to an LED of the plurality of LEDs,
      wherein each portion of the plurality of portions comprises a pixel addressing block and each pixel addressing block comprises a memory unit, and
      wherein a first portion of the plurality of portions of the semiconductor device further comprises a diagnosis function that when activated is arranged for supplying an output diagnosis signal; and
   a single chip mounted on the semiconductor device,
      wherein the plurality of LEDs is arranged in a matrix structure on the single chip and are connected to the semiconductor device.

2. The device according to claim 1, wherein the diagnosis function is activated via a diagnosis signal applied to at least the first portion of the semiconductor device.

3. The device according to claim 2, wherein the diagnosis signal is applied to a multiplexer to switch between the diagnosis function and a normal function of operation.

4. The device according to claim 1, further comprising a comparator that is arranged for determining the output diagnosis signal as:
   the output diagnosis signal has a first value in case a voltage for driving the LED is below a predetermined first threshold or above a predetermined second threshold;
   the output diagnosis signal has a second value in case the voltage for driving the LED is not below the predetermined first threshold or not above a predetermined second threshold.

5. The device according to claim 1, wherein the output diagnosis signal is provided at an output of the portion of the semiconductor device for driving the LED of the plurality of LEDs arranged in the matrix structure.

6. The device according to claim 1, wherein each portion of the plurality of portions of the semiconductor device comprises the diagnosis function.

7. The device according to claim 1, further comprising:
   a shift register comprising at least two cells, wherein an output of each cell of the shift register controls one of the LEDs;
   wherein the at least two cells are connected in series and are driven by a clock signal;
   wherein each cell of the shift register comprises a flip-flop and a register;
   wherein the output of the flip-flop is connected with the input of the register;
   wherein the register is arranged to store the output of the register based on an update signal and wherein the output of the register controls one of the LEDs;
   wherein the flip-flops of the at least two cells are filled with a data signal based on the clock signal;
   wherein after a predetermined number of cycles of the clock signal, the update signal is conveyed to the registers driving the LEDs according to the values stored in the flip-flops of the cells; and
   wherein the output diagnosis signal is stored in at least one cell of the shift register when the diagnosis function is activated.

8. The device according to claim 7, wherein the flip-flop is a D-flip-flop and the register is an additional D-flip-flop, wherein the update signal is conveyed to the clock terminal of the additional D-flip-flop.

9. The device according to claim 7, wherein the matrix structure comprises at least two rows and at least two columns.

10. The device according to claim 9, wherein the register of the shift registers is associated with each LED of the matrix structure.

11. The device according to claim 9, wherein the cells of the shift register are part of the semiconductor device, on top of which the matrix structure comprising the LEDs is arranged.

12. The device according to claim 11, wherein the semiconductor device comprises a driver for each LED of the matrix structure.

13. The device according to claim 12, wherein the driver for each LED of the matrix structure comprises a current mirror that is supplied with at least one reference current.

14. The device according to claim 13, wherein the at least one reference current is generated at a common area of the semiconductor device and supplied to all drivers for the LEDs of the matrix structure.

15. The device according to claim 12, wherein the at least two cells of the shift register and the driver associated with a single LED of the matrix structure are arranged on a surface area having a size that corresponds to the size of the surface area of the single LED of the matrix structure.

16. The device according to claim 11, wherein the semiconductor device comprises a common circuitry for the LEDs of the matrix structure.

17. The device according to claim 16, wherein the common circuitry is arranged in an area adjacent to the shift register.

18. The device according to claim 7, further comprising a printed circuit board, wherein the semiconductor device is mounted on the printed circuit board.

19. The device according to claim 1, wherein the memory unit comprises a shift register.

* * * * *